Patented Dec. 2, 1947

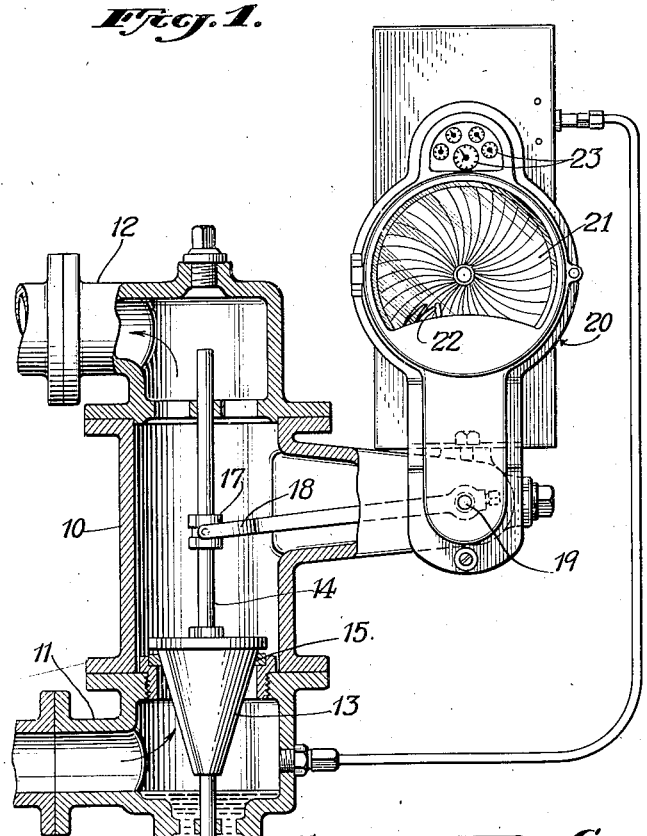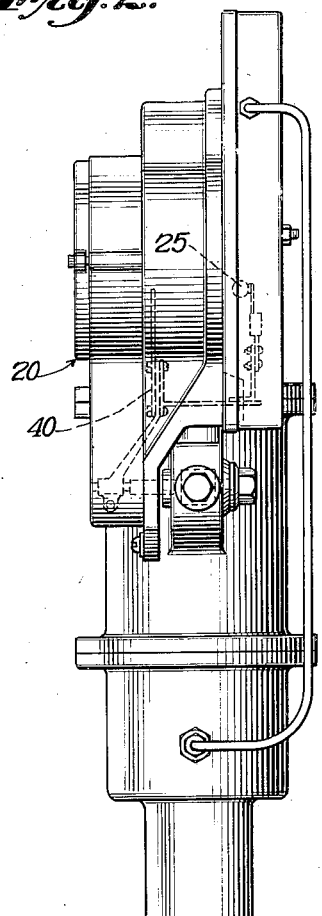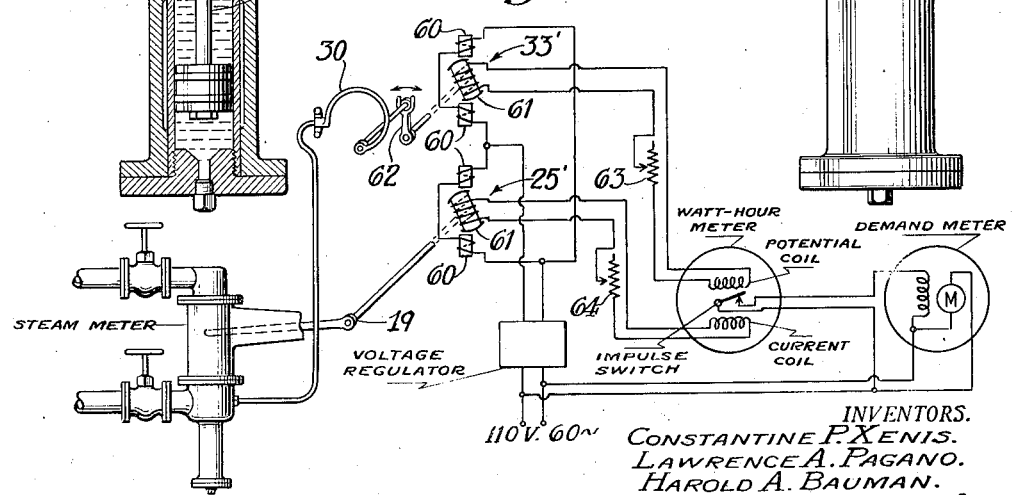

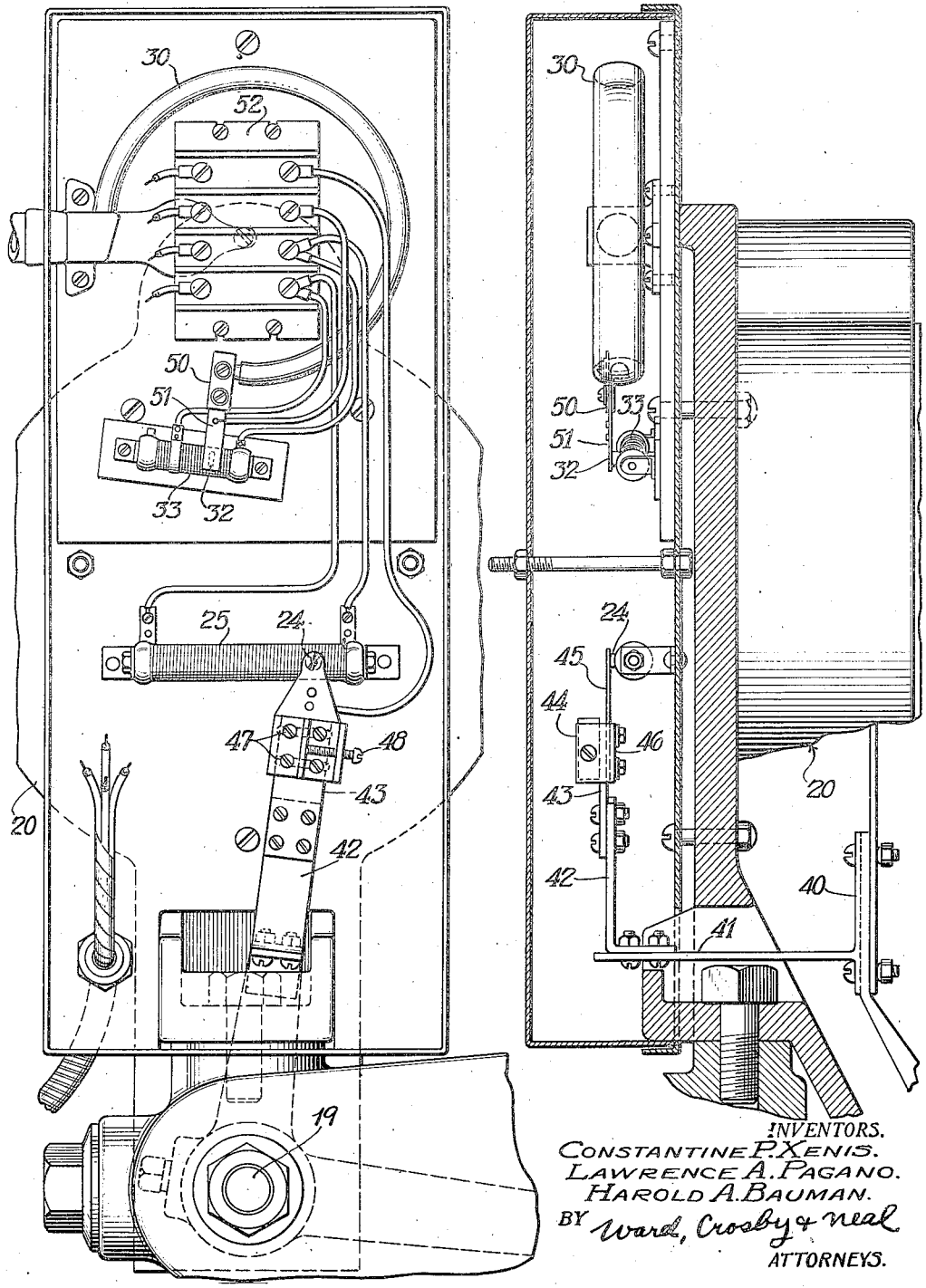

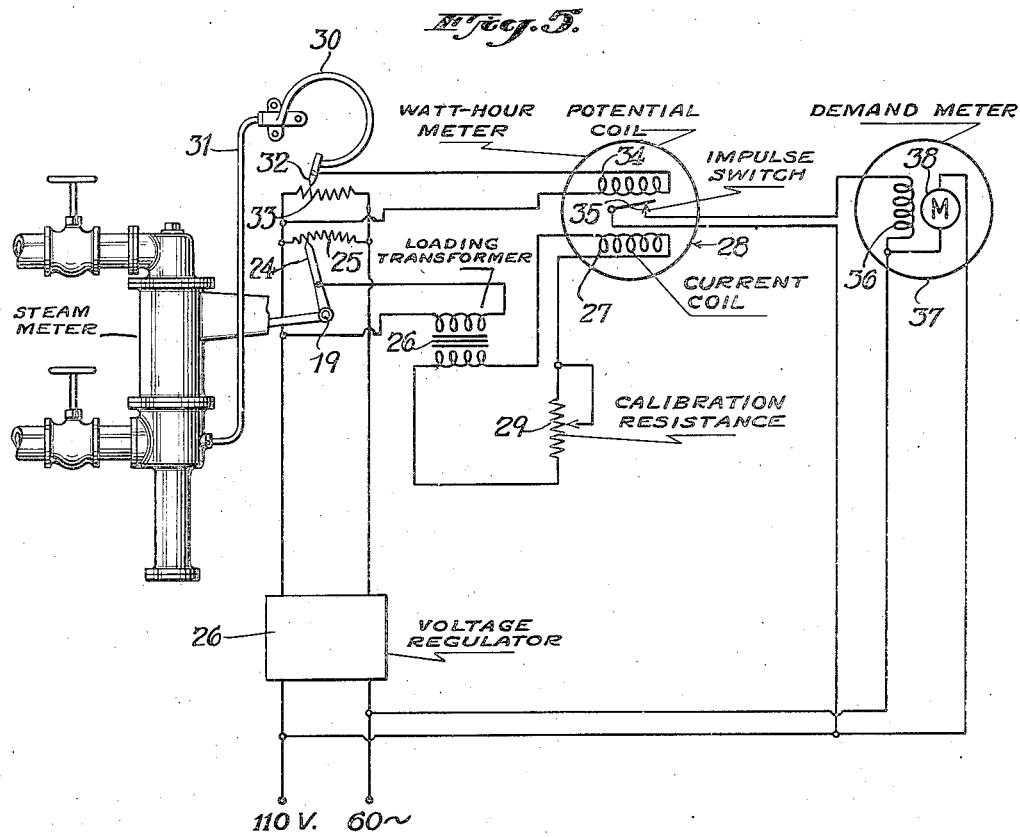
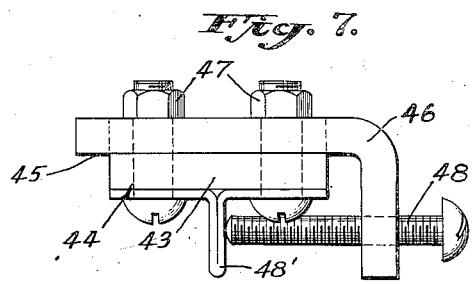

2,431,722

UNITED STATES PATENT OFFICE 2,431,722

STEAM METERING APPARATUS

Constantine P. Xenis, Douglaston, Lawrence A. Pagano, Brooklyn, and Harold A. Bauman, Forest Hills, N. Y., assignors to Consolidated Edison Company of New York, New York, N. Y., a corporation of New York Application June 14, 1944, Serial No. 540,346

2 Claims. (Cl. 73—210)

This invention relates to improved apparatus for metering steam.

It has heretofore been the practice in some localities to meter steam as supplied to customers from a central plant, by the use of area meters such as for example the so-called St. John type, having a tapered plug adapted to be raised and lowered to varying degrees within an orifice, by the effect of the steam passing therethrough, and the plug being connected by suitable mechanism to actuate a recording pen on a suitable chart, and also to actuate a planimeter type of integrating registering mechanism. The readings obtainable with such arrangements would in general be satisfactory if the pressure of the steam supply remained constant. However, the indications given are subject to serious errors if the steam pressure differs from that for which the meter was calibrated. To correct such errors it has been common practice to follow a somewhat elaborate procedure for correcting the meter readings in accordance with estimated pressure of the steam supply or in accordance with pressures which have been recorded at different places in the system.

The present invention overcomes these difficulties by an arrangement which in effect continuously translates the varying positions of the meter plug, into a correspondingly varying electrical factor. At the same time the varying pressures of the steam supply at the meter are used to continuously and correspondingly vary another electrical factor, i. e., a pressure correction factor, which is automatically multiplied by the first electrical factor by the use of an instrument such as a watthour meter. The latter instrument will therefore directly and accurately register the integrated quantity by weight, of the metered steam without the necessity of subsequently applying any pressure correction factor to the readings. The watthour meter dials may be calibrated in terms of pounds of steam supplied, and the meter can accordingly be read by any meter reader accustomed to reading watthour meters, and the necessity of correcting the readings by the work of skilled technicians is avoided.

It is customary to base the charges for steam supplied, in part at least, on the maximum demand which the customer has had, for example, during any period of predetermined length. In order to determine the customer's maximum demand for each such period, according to the present invention the watthour meter used may be of a known type equipped with an impulse switch for transmitting an impulse for each predetermined number of pounds of steam indicated by the watthour meter. These impulses may be transmitted to one of the commonly available types of electrical maximum demand meters. In the maximum demand meter each impulse causes a short line to be drawn on a chart, such line being continued by succeeding impulses for say one-half hour, and accordingly the lengths of these lines representing the total demand during each half hour will show directly the maximum demand of any half hour period. Thus this meter may also be read by any meter reader accustomed to reading maximum demand meters.

Various further and more specific objects, features and advantages of the invention will appear from the description given below taken in connection with the accompanying drawings illustrating by way of example preferred forms of the invention. The invention consists in such novel features and combinations as may be shown and described in connection with the apparatus herein disclosed.

In the drawings:

Fig. 1 is a view showing in section an area type meter (of the above-mentioned St. John type), together with certain associated apparatus;

Fig. 2 is a side view of the same;

Figs. 3 and 4 respectively are rear and vertical sectional views of a control panel embodying the invention;

Figs. 5 and 6 are electrical diagrams for two forms of the invention and Fig. 7 is a sectional view showing certain details.

Referring to Fig. 1, the meter as shown may comprise a chamber 10 having an inlet 11 and an outlet 12. A tapered plug is indicated at 13 mounted on a vertically slidable shaft 14. The plug is here shown with a taper which is considerably exaggerated for clearness. The plug is adapted to cooperate with an orifice 15 and to rise and fall in the orifice by amounts varying substantially in accordance with the rate of flow of steam by volume through the meter. That is, the plug will assume a vertical position such as to maintain a substantially constant pressure drop across the orifice. In the usual case, such drop will amount to about two pounds, assuming the pressure of the steam supply is within a range of say about 100–150 pounds. The lower end of the shaft 14 may be provided with dash-pot means as at 16 of a known type to prevent excessive abrupt movements of the plug. A grooved collar 17 is fixed at a suitable position on the shaft 14 and is adapted to be engaged by a yoke member 18, the supporting arm of which is pivotally mounted on a shaft 19. As heretofore used, meters of this type have commonly been connected to operate a recording device as at 20 having a constantly rotating chart 21 on which the steam flow indications are indicated as by a recording pen 22. The recording mechanism also has associated therewith a planimeter type of integrating registering mechanism, the registering dial of which is indicated at 23. The present invention is adapted to be applied to the arrangement of Fig. 1 as thus far described, leaving the instruments 20, 23 in position if desired for checking purposes, or if preferred, these instruments may be discarded.

Reference will now be had to Fig. 5 in explaining one example of the equipment arranged according to the present invention. As here shown, the shaft 19 of the St. John meter is connected to operate an adjustable contact 24 of a potentiometer 25. This potentiometer may be connected through a voltage regulator as at 26, to a 110-volt 60-cycle power supply. The voltage regulator is preferably of a suitable well-known type. From the diagram of Fig. 5 it will be apparent that the potentiometer 25 is connected to supply through a loading transformer 26, current to the current coil 27 of a watt-hour meter 28. A suitable calibration resistance as at 29 may be interposed in series with this current coil.

A Bourdon tube 30 or other suitable pressure-indicating instrument is connected to the steam supply by a conduit 31 and is arranged to operate a contact 32 of a potentiometer 33 whereby potential is applied to the potential coil 34 of the watthour meter, varying directly in accordance with variations of the steam supply pressure.

The watthour meter 28 is so calibrated and the other parts are so proportioned that the watthour meter will register the integrated values of the product of an electrical factor representing the steam flow by volume, as multiplied by an electrical factor representing the varying steam pressure. Consequently the integrated values as registered will be in terms of pounds of steam supplied.

As shown, the watthour meter 28 may be of the type having an impulse switch 35 connected in series with the operating coil 36 of a suitable known type of maximum demand meter 37, the operating motor for which is indicated at 38. As shown, current for the operating coil and motor may be obtained from the 110-volt 60-cycle supply. With this arrangement it will be apparent that the impulse switch will transmit an impulse to the demand meter for each predetermined number of pounds of steam indicated by the watthour meter. The demand meter operating in the usual way will then draw lines on a chart, each of a length corresponding to the number of impulses received during successive predetermined periods. Thus the maximum demand which the customer has had for steam during any of such periods will be directly indicated, the chart being calibrated in terms of pounds of steam.

In calibrating the apparatus, the St. John meter, the potentiometer 25 and current coil 27 may be so arranged and adjusted in the circuits that with the steam pressure, say, at 125 pounds and with 100 volts on the potential coil 34, the watthour meter will read directly in terms of the amount of steam supplied by weight (at 125 pounds pressure). The St. John meter being adjusted, tested and calibrated to give accurate readings at 125 pounds pressure, for such pressure the pressure correction factor may be considered as unity, which is represented by 100 volts potential applied to the potential coil of the watt-hour meter. To determine the potential which should be applied to this coil to represent the pressure correction factor for other steam supply pressures, one may proceed as follows. To determine the correction factor necessary, say, for 190 pounds pressure, one may use the following formula, where $W_{190}$ represents the density of saturated steam at 190 pounds pressure, and $W_{125}$ represents the density of saturated steam at 125 pounds pressure—

$$\sqrt{\frac{W_{190}}{W_{125}}} = 1.20 \text{ approx.}$$

By referring to steam tables, it will be found that in this example the approximate correction factor should be 1.20, which may be represented on the potential coil of the watthour meter by applying 120 volts thereto. Thus the potentiometer 33 should be adjusted to give that voltage when the Bourdon tube indicates 190 pounds. In the same way it will be found that, say, for 90 pounds steam pressure the correction factor should be about 0.872, which may be represented on the watthour meter potential coil by 87½ volts. Consequently the potentiometer 33 is so designed in conjunction with the Bourdon tube as to supply such voltage when the steam pressure is 90 pounds. Correction factors for other steam pressures may of course be computed in the same way. Usually for any particular installation, the pressures will not vary by more than say 10–15 pounds, above or below the pressure for which the area meter was calibrated. Accordingly the arrangement will be sufficiently accurate for most practical purposes if it is considered that the correction factors vary according to a straight line law.

Reference will now be had to Figs. 3 and 4, which illustrate in further detail the mechanical features of the arrangement as applied in a preferred way to the present available St. John meter equipment. The shaft 19 has heretofore been connected to swing an arm as at 40 for operating the recording instruments 20, 23. In order to operate the potentiometer 25, according to the present invention an extension 41 may be formed on arm 40 protruding from the back of the recording instrument 20, and connected to swing a bracket 42 carrying an insulation support 43, which in turn is connected through an adjustable device 44 carrying a spring support 45 for contact 24. The adjustable device 44 may include a clamp piece 46 fixed to member 45 and slidably adjustable with respect to clamping screws 47 which are fixed in position on member 43. When the clamping screws 47 are loosened, the position of the contact may be adjusted by turning a screw 48, the end of which abuts a lip portion 48' which is fixed with respect to member 43 by the screws 47 as shown in further detail in Figure 7.

As shown, the resistance of potentiometer 25 may comprise a winding of resistance wire wound on a cylindrical insulation tube as shown. Since the contact 24 is arranged to swing over an arc, whereas the resistance is conveniently made as a straight element, provision should be made for correcting the slight errors arising from the fact that the resistance element is not arcuate. It is found that this may be readily accomplished by forming the contact 24 in the form of a narrow strip tilted at an angle as shown. As a result, the actual line of contact between contact 24 and the resistance will substantially follow a straight line within the limits of accuracy necessary for the arrangement, and with results substantially equivalent to those obtainable if the resistance element were arcuate.

As shown in Figs. 3 and 4, the Bourdon tube 30 may be provided at its actuating end with an insulation support 50 carrying a spring support 51 for contact 32, which engages the resistance of potentiometer 33. A suitable terminal block 52 for the electrical connections may be positioned within the Bourdon tube as shown.

Instead of using potentiometers as shown in Fig. 5, under certain circumstances it may be found preferable to use other forms of potential and current transmitting devices. For example, as shown in Fig. 6, so-called "rotatable transformers" may be used, of types now commercially available, and as indicated at 25' and 33'. These devices as shown may have primary or stationary windings as at 60 connected to the source of regulated voltage and secondary or rotor windings as at 61 connected respectively in series with the potential and current coils of the watt-hour meter. The rotor of device 33' may be connected through a suitable mechanical connection as at 62 to the Bourdon tube 30, whereby the angular position of the rotor is varied in accordance with the steam pressure. The rotor of device 25' on the other hand may be connected to shaft 19, whereby it assumes an angular position varied in accordance with the steam flow. Suitable calibrating resistances as at 63, 64 may be inserted in the circuits of the potential and current coils of the watthour meter as shown. It will be understood that the device 25' is so designed as to vary the current in the watthour meter coil substantially directly in accordance with the steam flow by volume. The device 33' on the other hand is constructed so as to apply a potential to the watthour meter potential coil varying directly in accordance with the steam pressure. In other respects the operation of the arrangement of Fig. 6 will be apparent from the above description of Fig. 5.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Steam metering apparatus comprising an orifice, a tapered plug movable in said orifice by the steam flow therethrough, to positions such as to maintain a substantially constant pressure drop across the orifice, a source of electric current of constant regulated voltage, manually adjustable means operatively connected to said plug for supplying current of an adjustable magnitude from said source, and which is varied automatically substantially in accordance only with the position of said plug, a pressure-responsive device connected to the steam supply and responsive to pressure variations therein, means operatively connected to said device for supplying from said source a potential varied automatically substantially in accordance with the pressure of the steam supply, a circuit in which said current flows and a separate circuit to which said potential is applied, whereby adjustments of said adjustable means may be made without modifying said varying potential, and a watthour type of instrument connected for effectively and constantly multiplying said varying current by said varying potential and for indicating the integrated value of the products.

2. Apparatus in accordance with claim 1 in which said means operatively connected to the plug is of a rotatable transformer type, and said means operatively connected to the pressure responsive device is also of a rotatable transformer type.

CONSTANTINE P. XENIS.
LAWRENCE A. PAGANO.
HAROLD A. BAUMAN.

REFERENCES CITED

The following references are of record in the file of this patent:

UNITED STATES PATENTS

| Number | Name | Date |
|---|---|---|
| 1,986,986 | Swartout | Jan. 8, 1935 |
| 1,027,250 | Hartung | May 21, 1912 |
| 919,640 | Robinson et al. | Apr. 27, 1909 |
| 2,329,370 | Hicks et al. | Sept. 14, 1943 |
| 2,030,523 | Keller | Feb. 11, 1936 |
| 2,330,427 | Hornfeck | Sept. 28, 1943 |
| 1,185,735 | Trood | June 6, 1916 |
| 2,318,153 | Gilson | May 4, 1943 |

FOREIGN PATENTS

| Number | Country | Date |
|---|---|---|
| 286,469 | Great Britain | Mar. 8, 1928 |
| 517,321 | Great Britain | Jan. 26, 1940 |
| 253,684 | Germany | Nov. 16, 1912 |

Certificate of Correction

Patent No. 2,431,722.  December 2, 1947.

CONSTANTINE P. XENIS ET AL.

It is hereby certified that the name of the assignee in the above numbered patent was erroneously described and specified as "Consolidated Edison Company of New York" whereas said name should have been described and specified as *Consolidated Edison Company of New York, Inc.*, as shown by the record of assignments in this Office; and that the said Letters Patent should be read with this correction therein that the same may conform to the record of the case in the Patent Office.

Signed and sealed this 17th day of February, A. D. 1948.

[SEAL]

THOMAS F. MURPHY,
*Assistant Commissioner of Patents.*